United States Patent
Choi et al.

(10) Patent No.: US 8,119,306 B2
(45) Date of Patent: Feb. 21, 2012

(54) BIPOLAR PLATE AND DIRECT LIQUID FEED FUEL CELL STACK

(75) Inventors: Kyoung Hwan Choi, Suwon-si (KR);
Jong-koo Lim, Seoul (KR); Yong-hun Cho, Gunpo-si (KR); Il Moon, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 1294 days.

(21) Appl. No.: 11/287,443

(22) Filed: Nov. 28, 2005

(65) Prior Publication Data

US 2006/0115705 A1    Jun. 1, 2006

(30) Foreign Application Priority Data

Nov. 29, 2004    (KR) .................. 10-2004-0098748

(51) Int. Cl.
*H01M 8/02* (2006.01)
*H01M 8/10* (2006.01)
*H01M 8/04* (2006.01)

(52) U.S. Cl. ........................ 429/514; 429/457
(58) Field of Classification Search ............ 429/514
See application file for complete search history.

(56) References Cited

U.S. PATENT DOCUMENTS

| | | | |
|---|---|---|---|
| 5,945,232 A | 8/1999 | Ernst | |
| 6,132,895 A | 10/2000 | Pratt | |
| 6,146,780 A | 11/2000 | Cisar et al. | |
| 6,309,773 B1 | 10/2001 | Rock | |
| 2003/0124405 A1 | 7/2003 | Rock | |
| 2004/0005502 A1 | 1/2004 | Schlag | |
| 2005/0260482 A1 * | 11/2005 | Frank et al. | ......... 429/38 |

FOREIGN PATENT DOCUMENTS

| | | |
|---|---|---|
| CN | 2429919 | 5/2001 |
| CN | 2580609 | 10/2003 |
| CN | 1493092 | 4/2004 |
| JP | 2000182636 | 6/2000 |
| JP | 2000-311696 | * 11/2000 |
| JP | 2001-118588 | * 4/2001 |
| JP | 2003282099 | 10/2003 |
| JP | 2004-281072 | 10/2004 |
| KR | 10-2004-0046825 | 6/2004 |
| WO | 03041199 | 5/2003 |
| WO | 03083979 | 10/2003 |
| WO | 2004047210 | 6/2004 |

* cited by examiner

*Primary Examiner* — John S Maples
(74) *Attorney, Agent, or Firm* — H.C. Park & Associates, PLC

(57) ABSTRACT

A bipolar plate and a direct liquid feed fuel cell stack are provided. The bipolar plate includes a manifold that is coupled with the fuel/oxidant path holes and a plurality of flow channels that are coupled with the manifold. The flow channels are divided into a plurality of groups, where the flow channel of each group forms a serpentine flow path and a length of each flow channel is substantially the same.

8 Claims, 4 Drawing Sheets

BIPOLAR PLATE AND DIRECT LIQUID FEED FUEL CELL STACK

CROSS-REFERENCE TO RELATED APPLICATION

This application claims priority to and the benefit of Korean Patent Application No. 10-2004-0098748, filed on Nov. 29, 2004, in the Korean Intellectual Property Office, the disclosure of which is incorporated herein in its entirety by reference.

BACKGROUND OF THE INVENTION

1. Field of the Invention

The present invention relates to a bipolar plate for a direct liquid feed fuel cell stack.

2. Description of the Background

A direct liquid feed fuel cell generates electricity by electrochemical reactions between an organic chemical compound such as methanol or ethanol and an oxidant such as oxygen. A direct liquid feed fuel cell has high energy density and high power density. The direct liquid feed fuel cell uses methanol, etc. directly as fuel, so external peripheral devices such as a fuel reformer are not required and the fuel can be easily stored and supplied.

Referring to FIG. 1, a single cell of a direct liquid feed fuel cell has a membrane electrode assembly (MEA) structure in which an electrolyte membrane 1 is interposed between an anode 2 and a cathode 3. The anode 2 and the cathode 3 include diffusion layers 22 and 32, respectively, to supply and diffuse fuel, catalyst layers 21 and 31, respectively, in which an oxidation/reduction reaction of fuel occurs, and electrode supporters 23 and 33, respectively.

A precious metal catalyst such as platinum that has excellent electrochemical properties even at low temperatures is used in catalyst layers 21 and 31. An alloy that includes a transition metal such as ruthenium, rhodium, osmium, nickel or the like is used to prevent catalyst poisoning that is caused by a carbon monoxide reaction by-product. Carbon paper, carbon cloth, or the like may be used for the electrode supporters 23 and 33. The carbon paper or carbon cloth is waterproofed so that fuel can be supplied easily and a reaction product can be discharged easily. The electrolyte membrane 1 is a polymer membrane that has a thickness of about 50 μm to about 200 μm and is a proton exchange membrane that contains moisture and has ion conductivity.

An electrode reaction in a direct methanol fuel cell (DMFC) that uses methanol and water as a mixed fuel includes an anode reaction in which fuel is oxidized and a cathode reaction caused by reduction of protons and oxygen. The anode, cathode, and overall reactions are shown below.

Anode reaction: 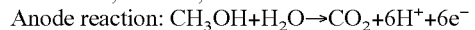
$CH_3OH + H_2O \rightarrow CO_2 + 6H^+ + 6e^-$

Cathode reaction: 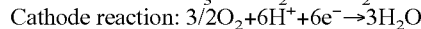
$3/2 O_2 + 6H^+ + 6e^- \rightarrow 3H_2O$

Overall reaction: 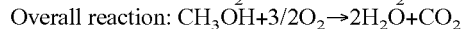
$CH_3OH + 3/2 O_2 \rightarrow 2H_2O + CO_2$

In the anode 2, carbon dioxide, protons, and electrons are generated by a reaction between methanol and water. The generated protons are transferred to the cathode 3 through the electrolyte membrane 1. In the cathode 3, water is generated by a reaction of protons, electrons that are transmitted via an external circuit (not shown), and oxygen. Thus, in a DMFC's overall reaction, methanol and oxygen react with each other and water and carbon dioxide are generated.

Theoretically, the voltage generated in a single DMFC is about 1.2 V and the open circuit voltage is equal to or less than about 1 V at room temperature under atmospheric pressure. The actual operating voltage is about 0.4 V to about 0.6 V because a voltage drop caused by an activation overpotential and a resistance overpotential occurs. Thus, in order to generate a desirably high voltage, a plurality of single cells should be connected in series.

A fuel cell stack is formed by stacking a plurality of single cells that are electrically connected in series. A bipolar plate 4, which is a conductive plate, is interposed between the single cells and couples the adjacent single cells together. A graphite block with excellent electrical conductivity, mechanical strength, and machining properties may be used as the bipolar plate 4. A block made of composite materials that contain a metal or a conductive polymer is also used as the bipolar plate 4.

Flow channels 41 and 42 that supply fuel (methanol) and air to the anode 2 and the cathode 3, respectively, are formed at both sides of the bipolar plate 4. An air channel 42 and a fuel channel 41 are formed at both sides of the bipolar plate 4 positioned in the middle of the stack. An end plate (not shown), which is a monopolar plate, supplies fuel or oxygen to each of the electrodes 2 and 3 and is disposed at ends of the stack. A channel (41 or 42 of FIG. 1) for supplying air or fuel to the contacting single cells is formed on the end plate.

FIG. 2 is a plan view of a surface of a conventional bipolar plate such as a surface on which a liquid fuel channel is formed. Referring to FIG. 2, in the conventional bipolar plate 4, a plurality of fuel/oxidant channels 41 are formed in a serpentine pattern in an electrode region 47 in which an MEA is disposed, so that upper portions of the fuel/oxidant channels 41 are opened. Manifolds 46 coupled with inlet and outlet of the fuel/oxidant channels 41, and fuel/oxidant path holes 43a, 43b, 44a, and 44b which communicate with the manifold 46 and through which liquid fuel or oxidant is supplied or discharged, are formed through the bipolar plate 4. The fuel/oxidant path holes 43a, 43b, 44a, and 44b form an inlet 43a and an outlet 43b of the liquid fuel and an inlet 44a and an outlet 44b of the oxidant.

In the flow channel with the serpentine shape shown in FIG. 2, the fuel/oxidant concentration gradient between the fuel/oxidant path hole 43a into which fuel/oxidant is flowed and the fuel/oxidant path hole 43b through which fuel/oxidant and a reaction product are discharged, is large. In addition, when the fuel/oxidant path holes 43a and 43b are formed at the same side, a plurality of flow paths may vary in length between the fuel/oxidant path holes 43a and 43b, and thus, flow velocities at the flow paths can be different. In addition, since the length of a flow path is large, a pressure loss is large.

SUMMARY OF THE INVENTION

The present invention provides a bipolar plate in which a pressure loss of fluid and a concentration gradient of the fluid is reduced.

The present invention also provides a direct liquid feed fuel cell stack having the bipolar plate.

Additional features of the invention will be set forth in the description which follows, and in part will be apparent from the description, or may be learned by practice of the invention.

The present invention discloses a bipolar plate for a direct liquid feed fuel cell in which a plurality of fuel/oxidant path holes through which fuel/oxidant is supplied and discharged are formed vertically. Flow channels that communicate with the fuel/oxidant path holes and through which the fuel/oxidant flows are formed on the fuel/oxidant path holes. The bipolar plate includes a manifold that is coupled with the fuel/oxidant path holes and a plurality of flow channels that are connected from the manifold. The flow channels are divided into a plurality of groups, such that the flow channels of each group form a serpentine flow path and the length of each flow channel in a group is substantially the same.

The present invention also discloses a bipolar plate for a direct liquid feed fuel cell in which a plurality of fuel/oxidant path holes through which fuel/oxidant is supplied and discharged are formed vertically. Flow channels that communicate with the fuel/oxidant path holes and through which the fuel/oxidant flows are formed on the fuel/oxidant path holes. The bipolar plate includes a manifold that is coupled with the fuel/oxidant path holes and a plurality of branch lines that are coupled with the manifold an inlet or an outlet coupled with each of the branch lines and a plurality of flow channels that are coupled with the corresponding inlet and outlet and are parallel to one another.

The present invention also discloses a direct liquid feed fuel cell stack in which a plurality of membrane electrode assemblies (MEAs) that include an anode and a cathode that are disposed at both sides of an electrolyte membrane are stacked. The MEAs are interposed between a plurality of bipolar plates that include a plurality of fuel/oxidant path holes through which fuel/oxidant is supplied and/or discharged from the anode or the cathode which are formed in a vertical direction. The bipolar plate further includes a manifold that is coupled with the fuel/oxidant path holes and a plurality of flow channels that are coupled with the manifold. The flow channels are divided into a plurality of groups, such that the flow channels of each group form a serpentine flow path and the length of each flow channel in a group is substantially the same.

The present invention also provides a direct liquid feed fuel cell stack in which a plurality of membrane electrode assemblies (MEAs) having an anode and a cathode disposed at both sides of an electrolyte membrane are stacked. The MEAs are interposed between a plurality of bipolar plates that include a plurality of fuel/oxidant path holes through which fuel/oxidant is supplied and/or discharged from the anode or the cathode and which are formed through in a vertical direction. The bipolar plate further includes a manifold that is coupled with the fuel/oxidant path holes and a plurality of branch lines that are coupled with the manifold an inlet or an outlet coupled with each of the branch lines, and a plurality of flow channels coupled with the corresponding inlet and outlet to be parallel to one another.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
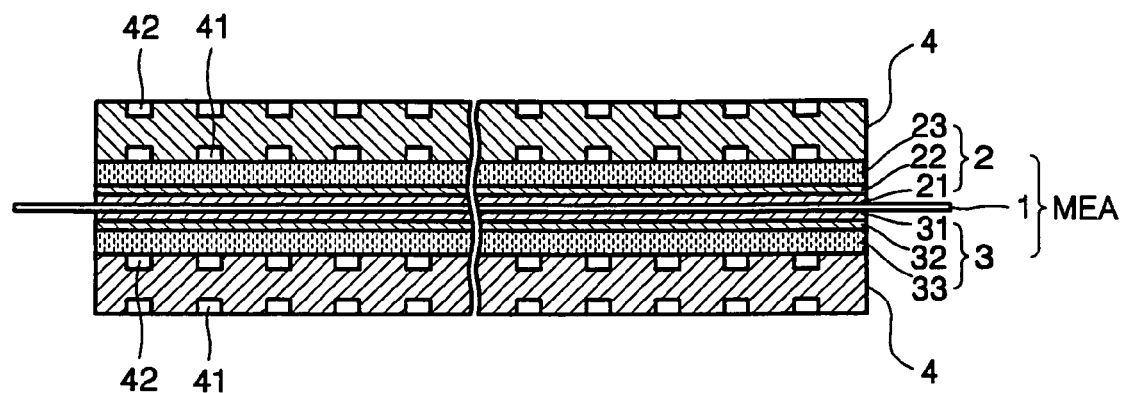
FIG. 1 is a cross-sectional view of a structure of a single conventional direct liquid feed fuel cell.
Figure 2:
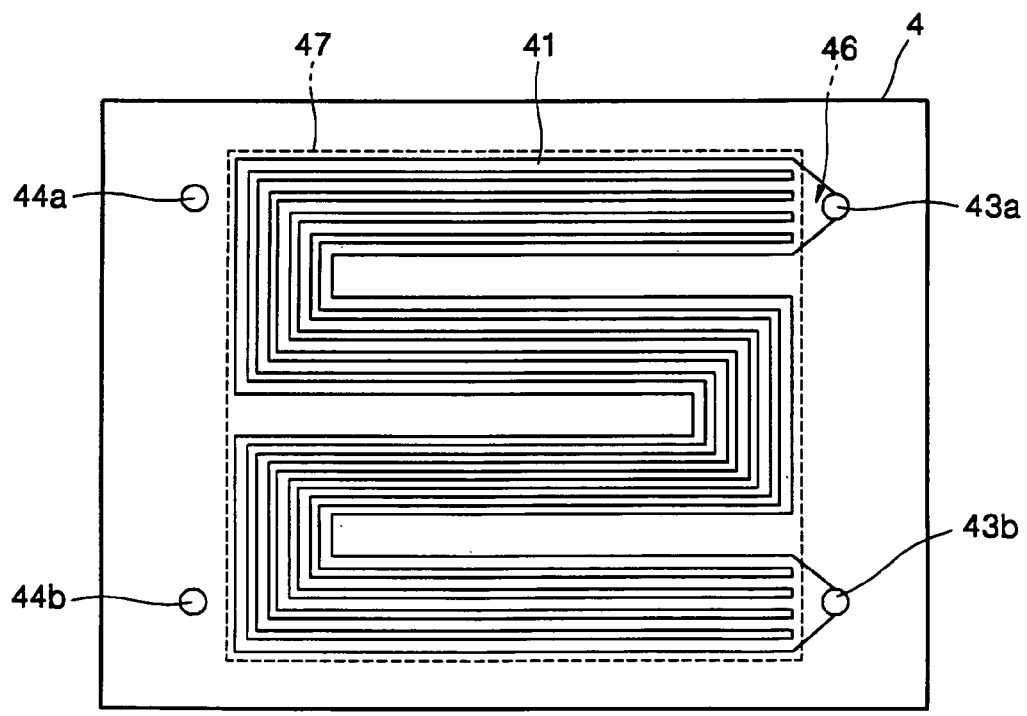
FIG. 2 is a plan view of a surface of a conventional bipolar plate.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

In the bipolar plate of the present invention, flow channels are divided into several groups. In addition, the length of a flow path through which fuel/oxidant flows is short, and the flow path length of each flow channel is substantially the same. In addition, concentration gradient between flow channels is reduced and a pressure loss in the flow channels is reduced.

A bipolar plate and a direct liquid feed fuel cell stack according an exemplary embodiment of the present invention will be described in detail with reference to the accompanying drawings.

Figure 3:
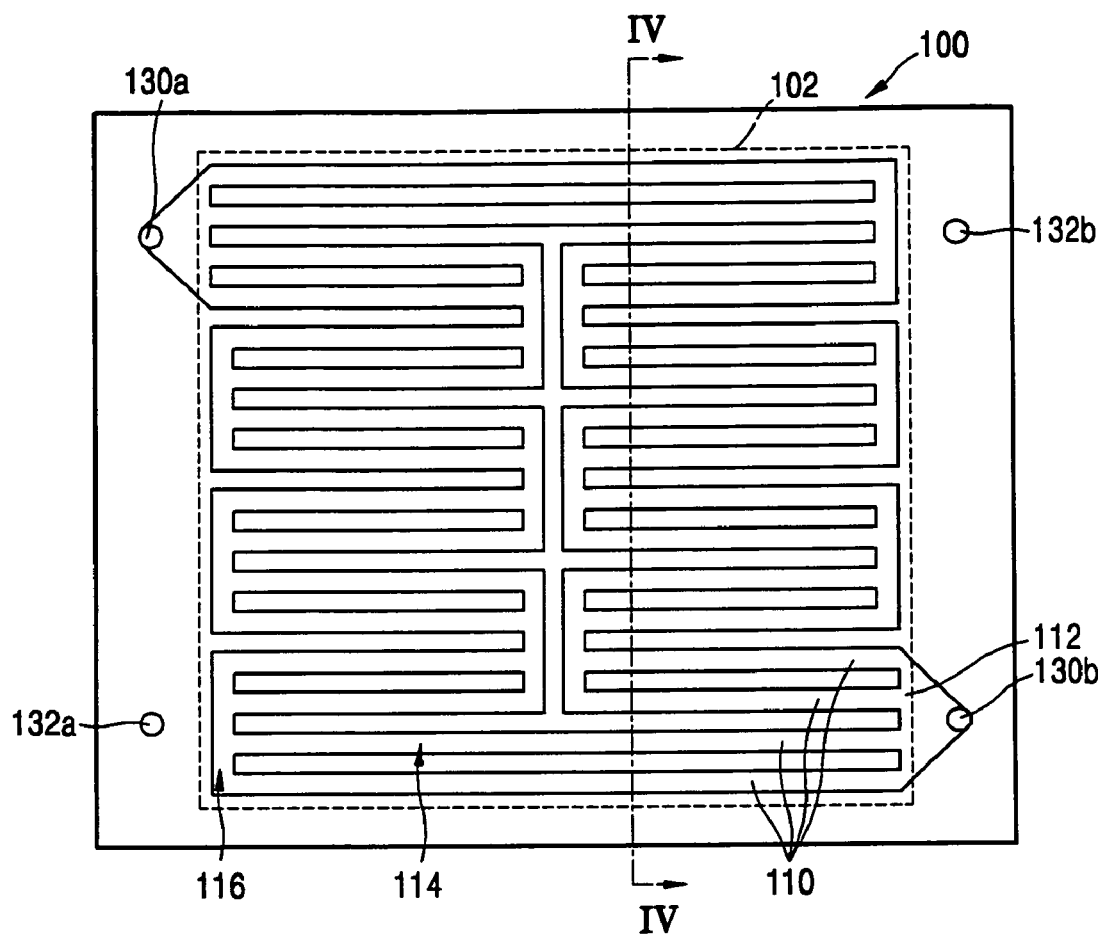
FIG. 3 is a plan view of a bipolar plate according to an exemplary embodiment of the present invention.
Figure 4:
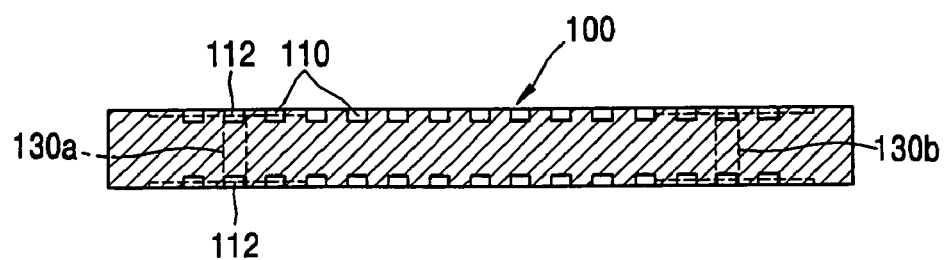
FIG. 4 is a cross-sectional view taken along line IV-IV of FIG. 3.

FIG. 3 is a plan view of a surface of a bipolar plate, for example, a surface on which a flow path of liquid fuel is formed, according to an exemplary embodiment of the present invention. FIG. 4 is a cross-sectional view taken along line IV-IV of FIG. 3.

Referring to FIG. 3 and FIG. 4, a flow channel 110 through which liquid fuel flows is formed on a top surface of a bipolar plate 100. A flow channel 110 through which oxidant (air) flows is formed on a lower surface of the bipolar plate 100. The flow channel 110 is formed in an electrode region 102 in which a membrane electrode assembly (MEA) is disposed.

The inlet and the outlet of the flow channel 110 communicate with a manifold 112. The manifold 112 communicates with fuel/oxidant path holes 130a, 130b, 132a, and 132b through which liquid fuel or oxidant is supplied or discharged. The fuel/oxidant path holes include an inlet 130a and an outlet 130b of the liquid fuel and an inlet 132a and an outlet 132b of the oxidant, which are formed through the bipolar plate 100.

The flow channel 110 that is coupled with the manifold 112 is divided into a plurality of groups, such as two groups. Portions of the flow channel 110 that belong to each group are positioned same in the electrode region 102. The flow channel 110 may be a serpentine-shaped flow path that includes a plurality of straight line portions 114 and a plurality of conversion portions 116. The flow path that passes through the plurality of straight line portions 114 is repeatedly combined at the conversion portions 116 and is divided into the plurality of straight line portions 114. The structure in which division and combination of the flow paths are performed repeatedly causes a reduction in the fuel/oxidant concentration gradient between the flow channels 110 in each group.

The path length of the bipolar plate 100 shown in FIG. 3 is about half the path length of the conventional serpentine flow path. That is, the path length is reduced by the number of groups divided at the manifold 112. Thus, since the path length from one side of the manifold 112 to the other side of the manifold 112 is reduced, the concentration gradient at an electrode region is reduced accordingly.

Since corresponding fuel/oxidant path holes 130a and 130b for the liquid fuel, and 132a and 132b for the oxidant, are formed diagonally from each other, the path length of each flow channel is substantially the same.

In the present invention, a configuration in which the flow channel of each group is repeatedly combined and divided is not limited thereto. That is, the flow channels of each group may be formed separately as a serpentine flow channel.

The flow rate of fluid in each flow channel in the bipolar plate 100 is substantially uniform.

Figure 5:
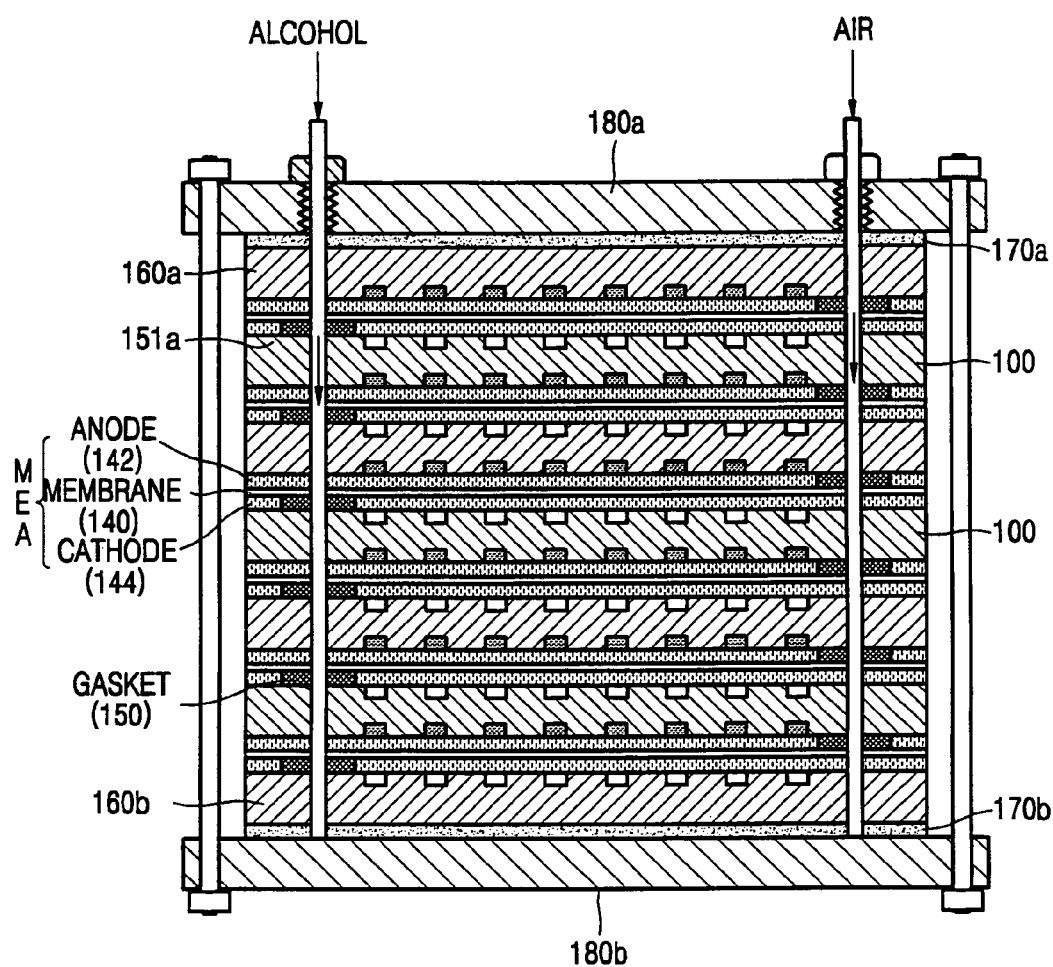
FIG. 5 is a cross-sectional view of a direct liquid feed fuel cell stack using the bipolar plate shown in FIG. 3.

FIG. 5 is a cross-sectional view of a direct liquid feed fuel cell stack using the bipolar plate shown in FIG. 3. The same reference numerals are used in the elements that are substantially the same as FIG. 3, and a detailed description thereof will be omitted.

Referring to FIG. 5, a plurality of MEAs are stacked in the fuel cell stack, and a bipolar plate 100 as a conductive plate is disposed between the MEAs. An anode 142 and a cathode 144 are disposed at either side of a membrane 140. Terminal conductive plates 160a and 160b are disposed above and below the stack. Only one surface of each of the terminal conductive plates 160a and 160b, on which flow channels (110 of FIG. 3) are formed, contacts the MEA. The operation of the terminal conductive plates 160a and 160b is the same as the bipolar plate 100. Current collecting plates 170a and 170b are disposed on the outer surface of the terminal conductive plates 160a and 160b, respectively. The MEAs, the bipolar plate 100 interposed therebetween, the terminal conductive plates 160a and 160b disposed above and below the stack, and the current collecting plates 170a and 170b may be joined by screws and by fixation end plates 180a and 180b.

A sealant 150, such as a gasket prevents liquid fuel or oxidant (air) from the fuel/oxidant path holes 130a, 130b, 132a, and 132b from contacting the anode 142 or the cathode 144.

Figure 6:
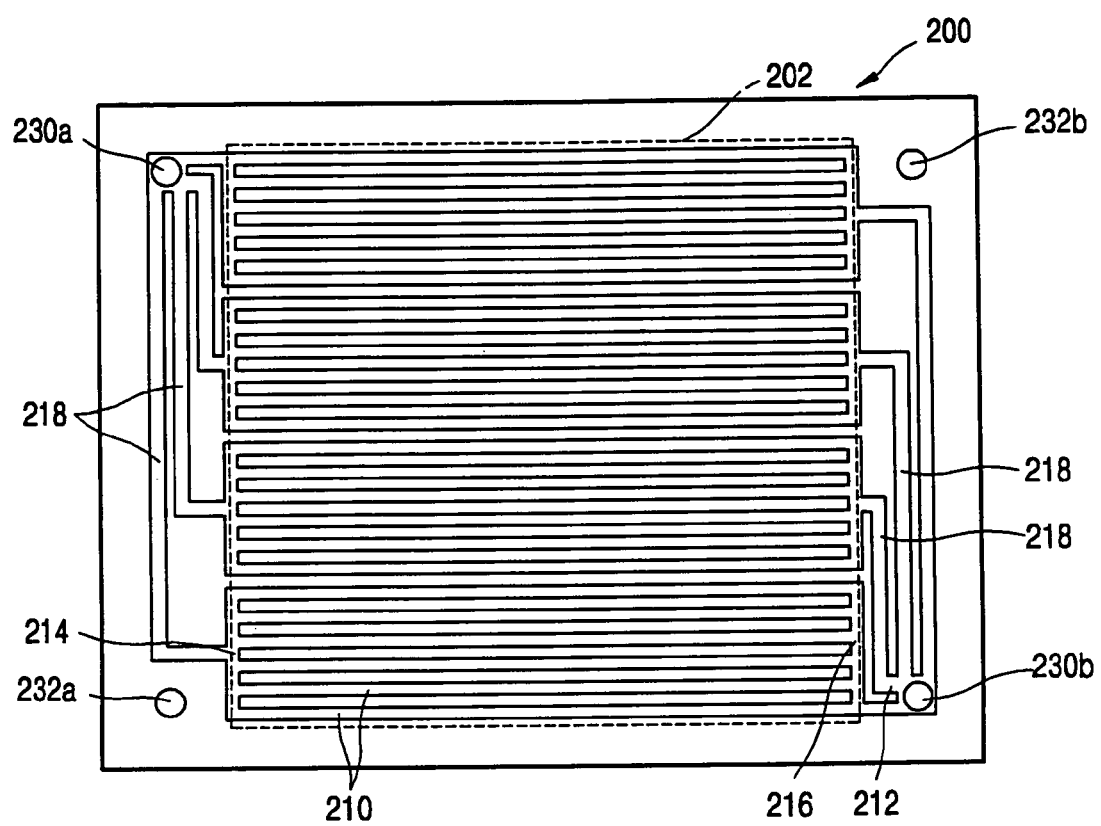
FIG. 6 is a plan view of a bipolar plate according to another exemplary embodiment of the present invention.

FIG. 6 is a plan view of a surface of a bipolar plate, such as a surface on which a flow path of liquid fuel is formed, according to another exemplary embodiment of the present invention. Referring to FIG. 6, a flow channel 210 through which liquid fuel flows, is formed on the top surface of the bipolar plate 200. The flow channel 210 is formed in an electrode region 202 in which an MEA is disposed.

The flow channels 210 are disposed parallel to each other and divided into a plurality of groups, such as four groups. Inlets and outlets of the flow channels 210 of each group are coupled with an inlet 214 and an outlet 216. Each inlet 214 and each outlet 216 are coupled with a manifold 212 via branch lines 218. The manifolds 212 communicate with fuel/oxidant path holes 230a, 230b, 232a, and 232b through which liquid fuel or oxidant is supplied or discharged. The fuel/oxidant path holes include an inlet 230a and an outlet 230b of the liquid fuel and an inlet 232a and an outlet 232b of the oxidant, which are formed through the is bipolar plate 200.

The branch lines 218 are formed separately to avoid communication with each other. The corresponding fuel/oxidant path holes 230a and 230b are formed diagonally from each other. The length of the branch lines 218 including a length between the inlet 214 and the fuel/oxidant path hole 230a and a length between the outlet 216 and the fuel/oxidant path hole 230b of each group are substantially the same.

Since the length of a flow path of the bipolar plate 200 shown in FIG. 6 is shorter than the length of a conventional serpentine flow path, the concentration gradient of the electrode region is reduced. In addition, a pressure loss in the flow channel is reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A bipolar plate for a direct liquid feed fuel cell, comprising:
   a first fuel/oxidant path hole, through which fuel/oxidant is supplied and a second fuel/oxidant path hole, through which fuel/oxidant is discharged;
   a first manifold coupled with the first fuel/oxidant path hole and a second manifold coupled with the second fuel/oxidant path hole; and
   a plurality of flow channels each disposed to directly couple with the first manifold and the second manifold, and each flow channel covers a different area of the bipolar plate,
   wherein the flow channels communicate with the fuel/oxidant path holes,
   wherein fuel/oxidant flows are formed through the flow channels,
   wherein the flow channels are equally divided into a plurality of groups,
   wherein each flow channel of each group forms a serpentine flow path, and
   wherein the length of each flow channel is the same as the length of all other flow channels.

2. The bipolar plate of claim 1,
   wherein the flow channel of each group comprises straight line portions and conversion portions that change a direction of flow path, and
   wherein the plurality of straight line portions are coupled at the conversion portions.

3. The bipolar plate of claim 1, wherein corresponding fuel/oxidant path holes are disposed diagonally from each other.

4. The bipolar plate of claim 1, wherein the flow channel of each group comprises a separate serpentine flow channel.

5. A direct liquid feed fuel cell stack in which a plurality of membrane electrode assemblies (MEAs) comprising an anode and a cathode disposed at both sides of an electrolyte membrane are stacked and which is interposed between a plurality of bipolar plates, wherein the bipolar plate comprises:
   a first fuel/oxidant path hole, through which fuel/oxidant is supplied to the anode or the cathode and a second fuel/oxidant path hole, through which fuel/oxidant is discharged from the anode or the cathode;
   a first manifold coupled with the first fuel/oxidant path hole and a second manifold coupled with the second fuel/oxidant path hole; and
   a plurality of flow channels each disposed to directly couple with the first manifold and the second manifold, and each flow channel covers a different area of the bipolar plate,
   wherein the flow channels are divided into a plurality of groups,
   wherein each flow channel of each group forms a serpentine flow path, and
   wherein the length of each flow channel is the same as the length of all other flow channels.

6. The direct liquid feed fuel cell stack of claim 5,
   wherein the flow channel of each group comprises parallel straight line portions and conversion portions that change a direction of flow path, and
   wherein the plurality of parallel straight line portions are coupled at the conversion portions.

7. The direct liquid feed fuel cell stack of claim 5,
   wherein the corresponding fuel/oxidant path holes are disposed diagonally from each other.

8. The bipolar plate of claim 5, wherein the flow channel of each group comprises a separate serpentine flow channel.

* * * * *